June 6, 1967

M. H. LACY 3,323,619

TRAILER HITCH BRAKING ASSEMBLY

Filed Aug. 27, 1965

INVENTOR.
MELVIN H. LACY,
BY
*Berman, Davidson & Berman*
ATTORNEYS.

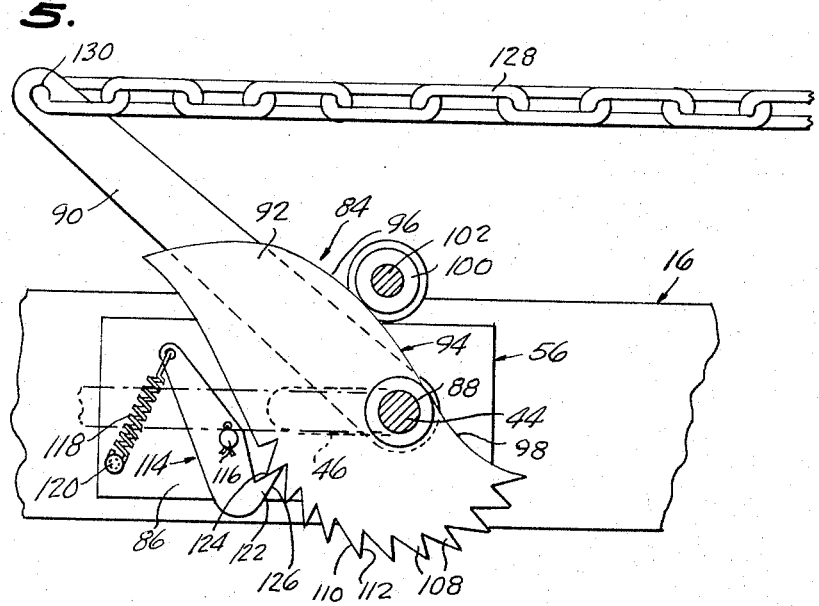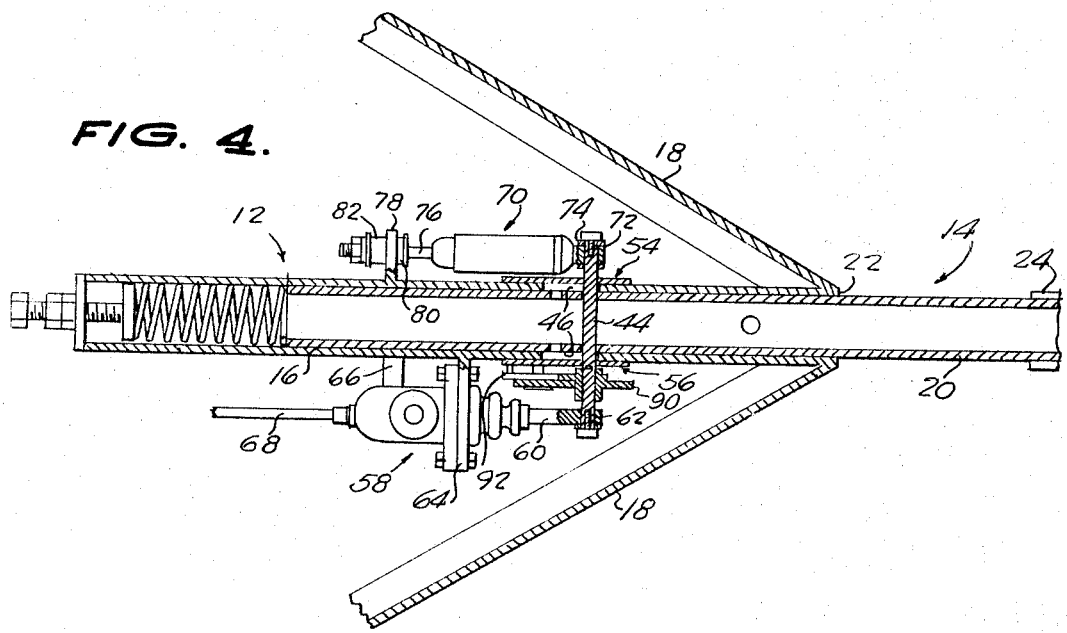

3,323,619
TRAILER HITCH BRAKING ASSEMBLY
Melvin H. Lacy, Shreveport, La.
(Rte 1, Box 418, Benton, La. 71006)
Filed Aug. 27, 1965, Ser. No. 483,148
7 Claims. (Cl. 188—112)

This invention relates to a safety braking assembly for trailer hitches.

The primary object of the invention is the provision of a simple, reliable, and efficient assembly of the kind indicated above, which is advantageously devoid of a complicated trailer-tractor vehicle hook-up, and wherein the braking mechanism of the assembly is adapted to be applied by rearward movement of the tractor vehicle, relative to the trailer.

Another object of the invention is the provision of an assembly of the character indicated above, wherein cushioning shock absorbing means is incorporated to relieve the brake operating and releasing mechanism and the connection between the trailer hitch and the tractor vehicle, of jerking movements otherwise incident to sudden starts and stops of the tractor vehicle.

A further object of the invention is the provision of an assembly of the character indicated above, wherein is incorporated, in operative relation to the brake operating mechanism, of efficient and reliable emergency means for applying the brakes of the trailer and holding the brakes applied, through the operation of this brake operating mechanism, whenever the hitch becomes disconnected from the tractor vehicle and the tractor moves forwardly relative to the trailer.

In the drawings:

FIGURE 4 is a horizontal section, taken on the line 4—4 of FIGURE 2; and,

FIGURE 5 is an enlarged fragmentary side elevation, showing the lever and ratchet mechanism of the emergency brake applying means.

Figure 1:
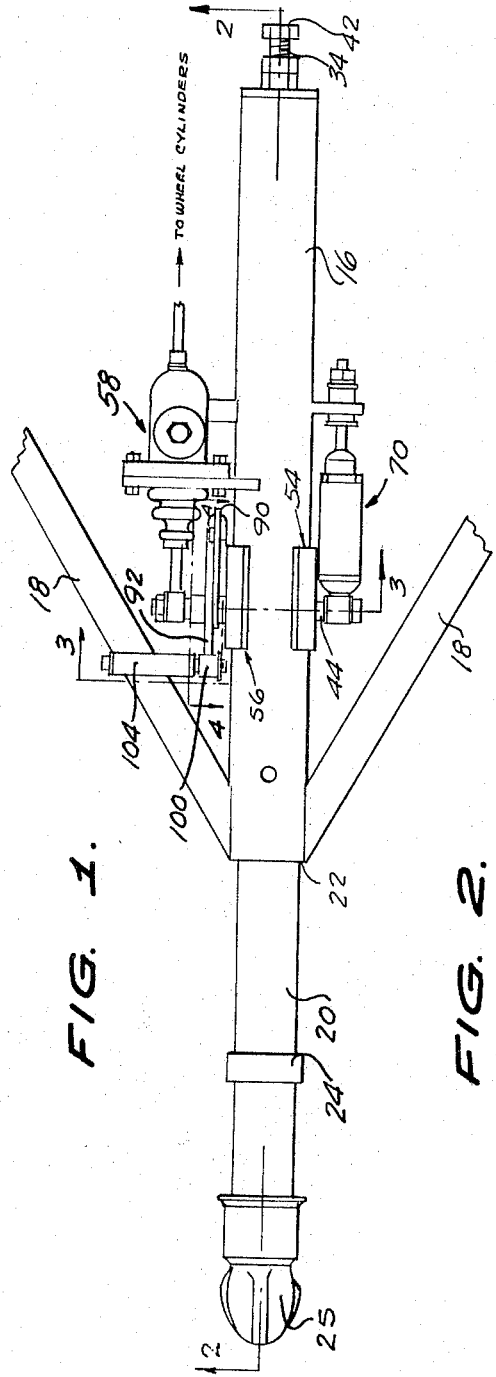
FIGURE 1 is a top plan view of an assembly of the present invention.

Referring in detail to the drawings, the illustrated assembly comprises a trailer hitch 10, having a stationary or fixed section 12, and a movable section 14. The fixed section 12 comprises a horizontally elongated tubular bar 16, from which fixed outriding rearwardly and outwardly angled bars 18 extend forwardly, for securement to the forepart of a trailer (not shown). The movable section 14 consists of a preferably tubular draw bar 20 which is slidably telescoped into the tubular bar 16, through the open forward end 22 of the latter, and has thereon a fixed external stop collar 24, adapted, at times, to have stop engagement with the forward end 22. The draw bar 20 has a hitch coupling 25 fixed on its forward end, which is adapted to be coupled to a related member (not shown) on a tractor vehicle. The stationary section bar 20 is not directly connected to the associated trailer.

Figure 2:
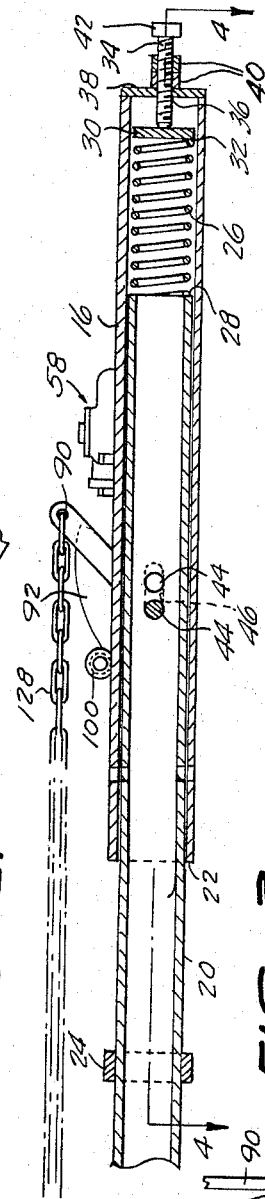
FIGURE 2 is a fragmentary vertical longitudinal section, taken on the line 2—2 of FIGURE 1.

As shown in FIGURES 2 and 4, a shock absorbing coil spring 26 is confined within the rear part of the tubular bar 16, of the stationary section 12, and is compressed between the rear end 28 of the draw bar 20 and a wear disc 30, whose rear side is engaged by the forward end 32 of an axial tension adjusting screw 34 which is threaded, as indicated at 36, through a closure plate 38 fixed to the rear end of the bar 16. Lock nuts 40, 40 are threaded on the screw 34, to bear against the rear side of the plate 38, to hold adjustments, and the screw is provided, on its rear end, with a wrench accommodating head 42 for effecting adjustments with the lock nuts backed off. The spring 26 is adapted to be adjusted endwise so as to predetermine a tension thereof, for a given trailer weight, and given operating conditions, required to afford a degree of latitude of movement of the tractor vehicle and the trailer, less than that producing operation of the brake operating mechanism of the hitch 10.

The brake operating mechanism of the hitch 10 comprises a cross bar 44 extending slidably through and arranged to work forwardly and rearwardly through horizontal, longitudinally elongated slots 46 provided in the opposed walls 48 of the tube 16, of the stationary section 12, the cross bar 44 normally being in a forward position in unoperated condition of the mechanism, and engaged with the forward ends of the slots 46, as shown in full lines in FIGURE 2. The cross bar 44 is journalled, as indicated at 50, through opposed walls of the draw bar 20, and, as indicated at 52, through left- and right-hand guide plates 54 and 56, which conformably and slidably engage related sides of the stationary bar 16, and protectively cover and extend beyond the ends of the slots 46.

The brake operating mechanism further comprises a horizontal longitudinal conventional fluid brake cylinder 58, disposed at the right-hand side of the stationary bar 16, behind the cross bar 44, and having a forwardly extending piston rod 60, which is connected, as indicated at 62, to the adjacent end of the cross bar 44. The brake cylinder 58 is fixedly mounted to the bar 16, as indicated at 64, and is braced relative thereto, as indicated at 66. A fluid brake line 68 leads from the rear end of the cylinder 58 and is adapted to be connected to the brakes (not shown) of the trailer.

With the foregoing arrangement, substantial slowing down of the tractor vehicle produces rearward movement of the draw bar 20 into the stationary bar 16, against the resistance of the cushioning spring 26, which rearward movement, if continued, produces rearward movement of the piston rod 60 sufficient to compress fluid within the brake cylinder 58 and thereby partially or fully apply the brakes of the trailer. The conventional brake cylinder 58 incorporates a spring (not shown) which, when the tractor vehicle resumes forward towing movement, relative to the trailer, acts to push the piston rod, and hence, the cross bar 44, forwardly to its starting position, and releases the trailer brakes.

A conventional two-way fluid shock absorber 70 has an ear 72, fixed on its forward end, which, as indicated at 74, is journalled on the related end of the cross bar 44. The shock absorber 70 has a relatively extending spring-extended piston rod 76 which extends slidably through a lateral lug 78, fixed on the adjacent side of the stationary bar 16, and through resilient grommets 80 and 82, engaged with related sides of the lug 78, in a conventional manner. The shock absorber 70 acts to dampen and cushion vagrant and sudden movements of the cross bar 44 and hence of the brake cylinder piston rod 60, in either direction, while being adapted to yield to permit application of the trailer's brakes by a full and positive rearward movement of the drawbar 20, relative to the stationary bar 16.

Figure 3:
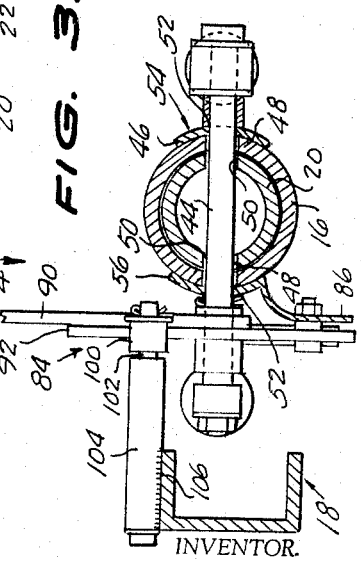
FIGURE 3 is an enlarged vertical transverse section, taken on the line 3—3 of FIGURE 1.

An emergency brake applying device 84 is operatively connected with the cross bar 44, and a pendant extension 86, on the right-hand slide 56. As shown in detail in FIGURES 3 and 4, the device 84 comprises a sleeve 88 journalled on the cross bar 44, between the brake cylinder piston rod 60 and the slide 56, with a rearwardly and upwardly angled lever 90 fixed to the sleeve. A ratchet sector plate 92 is fixed to the sleeve 88, at the outward side of the lever 90, and is elongated lengthwise of the lever 90, and extends above and below the sleeve 88.

The sector plate 92 is formed, along its forward edge, with a continuous irregularly curved cam edge 94, composed of an upper convex portion 96 and a lower concave portion 98. The cam edge 94 rides against the rear lower part of a flanged cam roller 100, which is journalled on the laterally inward end of a stub shaft 102. The stub shaft 102 extends through and is carried by a fixed transverse horizontal sleeve 104, which is fixed, as indicated at 106, on the top of the adjacent trailer hitch angle bar 18.

The sector plate 92 is formed, along its lower edge and an adjacent part of the rear edge, with a convex row of V-shaped ratchet teeth 108, which have rear cam edges 110 and forward stop edges 112. A ratchet dog or pawl 114 is pivoted, intermediate its ends, as indicated at 116, on the pendant extension 86 of the right-hand slide 56, and is normally disposed at an upward and rearward angle, relative to the perpendicular. A coil spring 118 is stretched between the upper end of the ratchet dog 114 and a pin 120, on the extension 86, located below the pivot 116, whereby the lower end of the dog is pressed toward the sector plate 92. The dog 114 has a rearwardly extending V-shaped nose 122, on its lower end, which has a rear stop edge 124 and a forward cam edge 126, adapted, respectively, for operative engagements, at times, with the stop edges 112 and the cam edges 110 of the sector plate ratchet teeth 108. A flexible chain 128 is secured, at its rear end, as indicated at 130, to the upper end of the lever 90, and is adapted to be secured, at its forward end, in a slack condition, to the associated tractor vehicle.

Should the trailer hitch 10 become disconnected, for any reason, from the tractor vehicle, and substantial separating movements of the trailer and tractor vehicle take place, the resultant pull on the chain 128 will serve to swing the lever 90 forwardly, from its normal rearward position, as shown in FIGURE 5, in contact with its cam roller 100, so that the cross bar 44 is forced rearwardly, along the slots 46, and operates the brake cylinder 58, so as to apply the trailer's brakes. Further, because of the resultant changed engagement of the ratchet dog nose 122, with the ratchet teeth 108 of the sector plate 92, accompanying the forward movement of the lever 90, the trailer's brakes will be held in applied condition, unless and until the ratchet dog 114 be manually released. In this way, running wild of the inadvertently unhitched trailer is automatically and positively prevented.

What is claimed is:

1. A trailer hitch comprising a stationary section adapted to be secured to a trailer, a movable section extending forwardly from the stationary section adapted to be secured to a tractor vehicle, means connecting the movable section to the stationary section to move endwise relative to the stationary section, trailer brake operating means operatively connected between the movable section and the stationary section, said brake operating means being adapted to be actuated by rearward movements of the movable section relative to the stationary section, emergency brake applying means carried by the stationary section and operatively connected to said brake operating means, said emergency means having a member adapted to be operatively connected to an associate tractor vehicle and adapted to be operatively moved by separation of the tractor vehicle from the associated trailer for operating the brake applying means, said emergency means comprising a lever to which said member is connected, said lever being pivoted on the stationary section and connected to the brake applying means, said lever having affixed thereto a sector plate formed with ratchet teeth, and a spring-pressed ratchet dog pivoted on the stationary section and engaged with said ratchet teeth, a fluid pressure shock absorber is fixed externally on said stationary section and is connected to said movable section, said shock absorber having a piston rod connected to the stationary section, said emergency trailer brake applying means comprising ratchet lever means mounted on and fixed to said stationary section and ratchet dog means mounted on said tubular bar and engaged with the ratchet lever means, and a member secured at one end to the ratchet lever means and adapted to be connected at its other end to an associated tractor vehicle for moving said lever means in response to separation of the tractor vehicle from an associated trailer and actuating said brake cylinder for applying the trailer brakes.

2. A trailer hitch according to claim 1, wherein said ratchet lever means has ratchet teeth, said ratchet dog having a nose adapted to ratchet over the ratchet teeth in one direction of movement of the ratchet lever means and to detent movement of the ratchet lever in the opposite direction for holding the trailer brakes applied.

3. A trailer hitch according to claim 1, wherein said ratchet lever means has an irregularly curved edge composed of convex and concave portions, and a roller journalled on the tubular bar with which said curved edge is operatively engaged for pivoting of said lever means and for varying the rate of application of the trailer brakes upon movement of the lever means in a direction to actuate the trailer brake operating means.

4. In a trailer hitch: telescoping, tubular members adapted respectively for attachment to a towing vehicle and a towed vehicle; a crossbar penetrating both members, said crossbar being secured in the inner member and axially slidable in slots in the outer member; a braking cylinder connected between one end of said crossbar and the outer of said tubular members; a lever pivoted on said crossbar; a cam movable with said lever; a follower fixedly mounted with respect to the outer of said tubular members and said follower being engageable with said cam to produce relative axial movement between said tubular members whereby to actuate said braking cylinder.

5. A trailer hitch as set forth in claim 4, including shock absorbing means connected between the opposite end of said crossbar and the outer one of said tubular members.

6. A trailer hitch as set forth in claim 4, including detent means restraining said lever, when displaced, from returning to its original position.

7. A trailer hitch as set forth in claim 5, including detent means restraining said lever, when displaced, from returning to its original position.

References Cited

UNITED STATES PATENTS

| | | | |
|---|---|---|---|
| 2,233,994 | 3/1941 | Cook | 188—112 |
| 2,648,407 | 8/1953 | Schwertner | 188—112 |
| 3,065,830 | 11/1962 | Krotz | 188—112 |
| 3,180,454 | 4/1965 | De Angelis et al. | 188—112 |

DUANE A. REGER, *Primary Examiner.*

MILTON BUCHLER, *Examiner.*

B. S. MOWERY, *Assistant Examiner.*